UNITED STATES PATENT OFFICE.

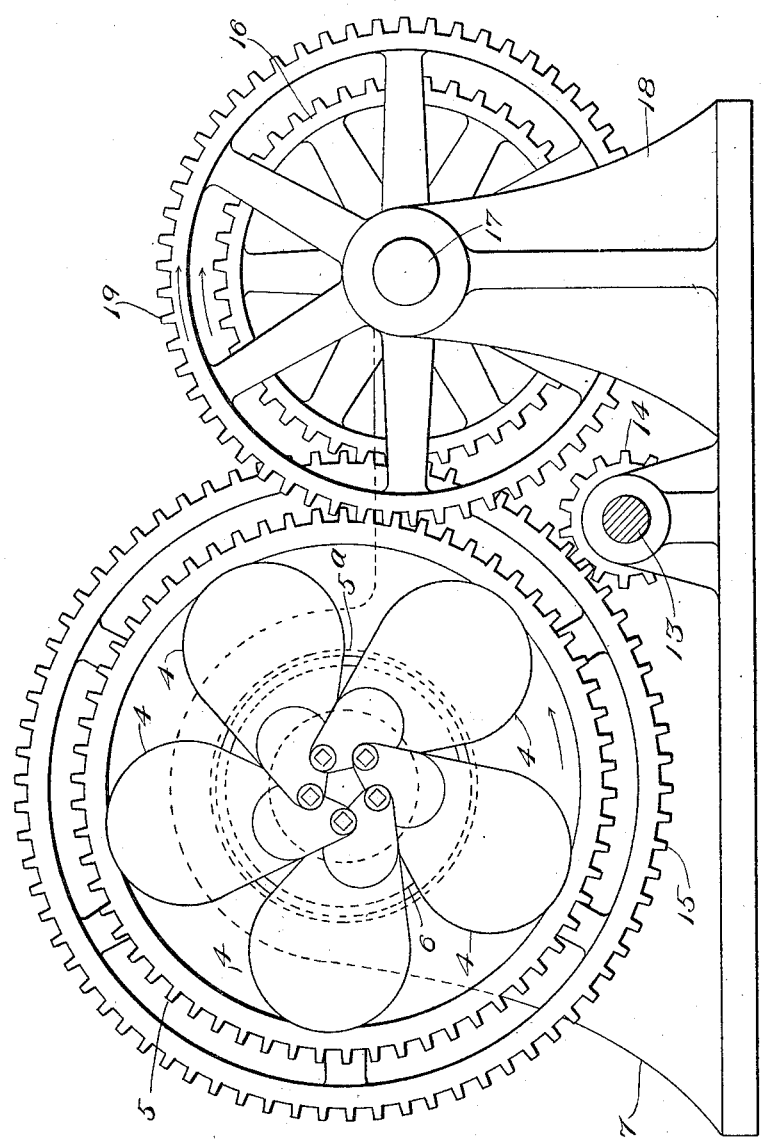

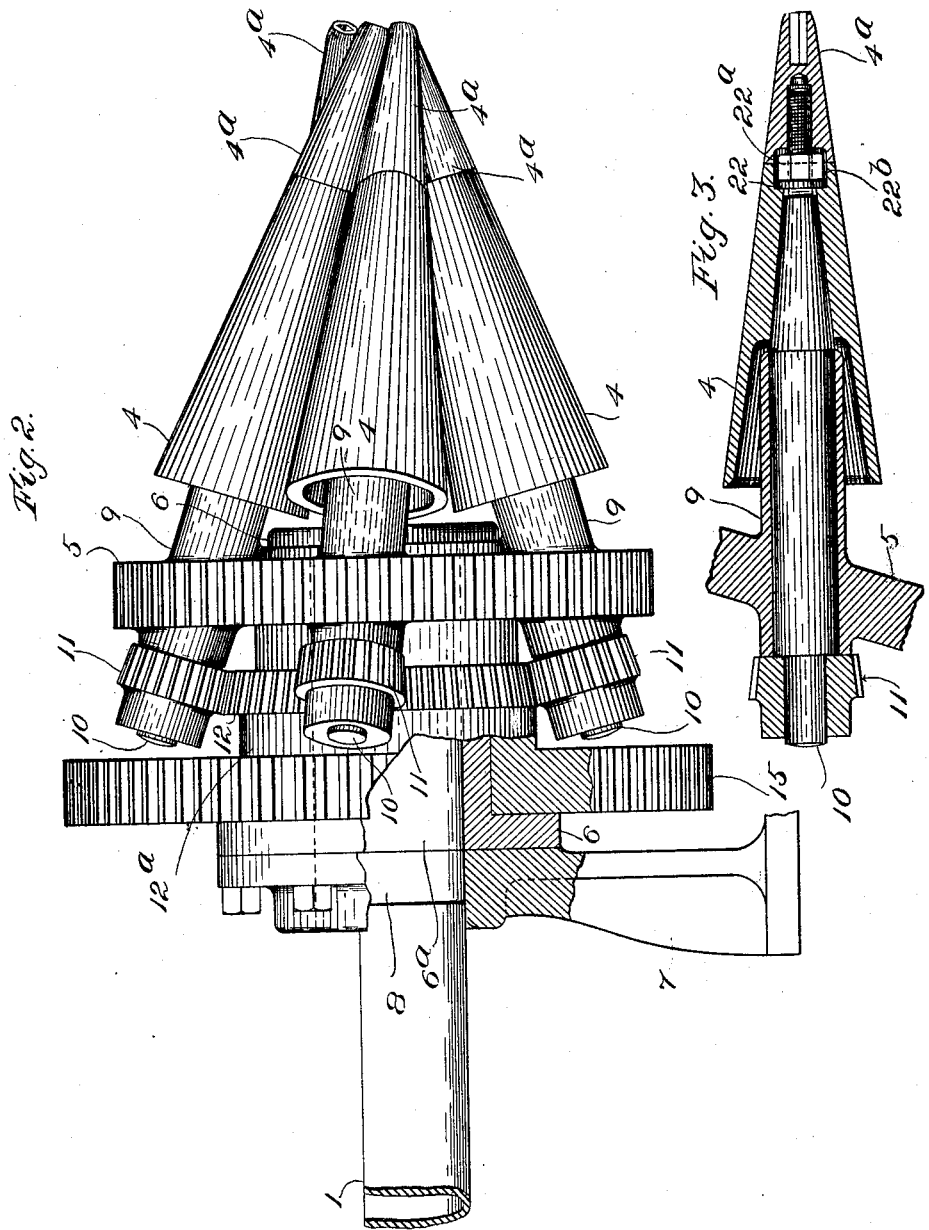

CHARLES H. WORSEY, OF PITTSBURGH, PENNSYLVANIA, ASSIGNOR TO E. R. KNOTT MACHINE COMPANY, OF BOSTON, MASSACHUSETTS, A CORPORATION OF MASSACHUSETTS.

CANDY-SPINNER.

1,102,624.

Specification of Letters Patent. Patented July 7, 1914.

Application filed May 19, 1911. Serial No. 628,149.

*To all whom it may concern:*

Be it known that I, CHARLES H. WORSEY, a citizen of the United States, residing at Pittsburgh, in the county of Allegheny, State of Pennsylvania, have invented a certain new and useful Improvement in Candy-Spinners, of which the following is a specification, reference being had therein to the accompanying drawings.

The invention consists in a rotary batch-reducer or spinner of novel construction, for use in reducing and extending candy and other plastic and ductile material, and especially useful in the manufacture of stick-candy.

The invention comprises various improvements which are hereinafter particularly described and claimed.

An embodiment of the invention is illustrated in the drawings, in which latter,—

Figure 1 is a view in end elevation of a spinner constructed in accordance with the invention, looking from the right hand side in Fig. 2. Fig. 2 is a side elevation thereof with certain small portions of stand 7 and boss 6 broken away. Fig. 3 is a detail view in section of one of the cones and its supporting bearing.

The spinner shown in the drawings consists, essentially, of a group or nest of cones 4, 4, etc., a rotatable carrier 5 therefor, and means for rotating the carrier so as to cause the group or nest to revolve around the axis of the carrier, and for rotating the respective cones upon their individual axes as they are thus revolved with the carrier. The cones of such group or nest are disposed in a series which is concentric with the axis of the carrier, and which incloses a central space or passage for the reception of the batch of candy to be reduced. They are set close together in the said series, with their axes converging, so that the central space or passage tapers gradually from the entrance thereof at the large ends of the cones toward the exit at the small ends of the cones. The respective axes of the individual cones have a slight transverse inclination or obliquity with relation to the prolongation of the axis of the carrier, so that the said axes cross the said axis at the small ends of the cones without, however, intersecting said axis.

In operation, the batch of candy to be reduced is passed into the central space at the large end of the latter until it is engaged with the surfaces of the cones. The direction of the rotation of the respective cones upon their individual axes is the same as that in which the carrier and series of cones are revolved. Consequently the cones roll around in contact with the exterior of the batch. At the same time, because of the obliquity of their individual axes with reference to the axis of rotation of the carrier, the rotation of the respective cones about their said individual axes acts to impel or feed the batch toward the small ends of the cones. The rolling action, taking place concurrently with the endwise feed of the batch, operates to reduce the batch gradually in diameter until it has assumed the size of the exit at the small ends of the cones and passes therethrough.

Certain of the special features of my invention comprise means for supporting and driving the cones of a rotary spinner wholly from the large ends thereof, adjacent the entrance to the central space that is inclosed by the cones, the small ends of the cones being free, clear, and readily accessible. The said features comprise, also, an extended bearing-support for each cone. These various features are shown in the drawings. In the embodiment thereof that is shown in the latter, the carrier 5 is made, for convenience, as a disk or wheel having a hub or short sleeve 5$^a$ and a central eye or opening. It is mounted upon a bearing-support that consists of a long tubular boss 6 projecting from a fixed stand 7, the said stand having an opening 8 therethrough, (shown in Fig. 2) which registers with the central opening or passage 6$^a$ through the boss. The opening 8 of the stand 7, and the opening or passage 6$^a$ within the bearing-support 6, are in line with the central space inclosed by the nest of cones, and the batch of candy passes therethrough to enter into the said central space. The tubular boss 6 constitutes a guide for the batch as the latter enters the spinner. Being stationary or non-rotative such guide has no tendency to turn or twist the batch. If a rotating guide were employed at this point in the machine, the contact of its inner surface with the batch would tend to turn and twist the latter. The cones 4, 4, etc., are located entirely at the delivery side of the disk-portion of carrier 5, their large ends being adjacent the said disk-portion. For the support of each cone upon the carrier I employ, by preference, and as one of the said special features of the invention, a long sleeve-bearing and a long pintle fitting together, one thereof being provided in connection with the carrier and the other with the cone.

In the preferred construction, the cone is hollow from its large end for a considerable portion of its length, and the bearing is extended lengthwise into the cone a considerable distance so that it serves to support the cone for a large portion of the length of the latter against springing under strain acting thereon at and adjacent its tip. In the illustrated embodiment of this portion of the invention, the sleeve-bearing is provided at 9 in connection with the carrier-disk, and the pintle 10 is secured to the cone and fits and turns within the said sleeve-bearing, although I consider that a reversal of this arrangement would still be within the scope of the invention. By employing a long sleeve-bearing with considerable length of contact between the bearing-surfaces of the same and the pintle, the latter is sustained against tendency to spring and bind in the bearing, and the rate of wear is reduced. The driving of the respective cones is affected in the said embodiment by means of pinions 11, 11, etc., fixed upon the portions of the pintles 10, 10, etc., which project through the sleeve-bearings 9, 9, etc. and a centrally-located bevel gear-wheel 12 with which the said pinions engage, the said bevel gear-wheel being formed upon a hub 12$^a$ which is sleeved upon tubular boss 6 alongside hub 5$^a$ of carrier 5.

In operation, rotary motion is communicated to bevel gear-wheel 12 and to carrier 5, in the same direction but at different speeds, the gear-wheel being driven more slowly than the carrier, the result being that the rotation of the carrier revolves the series of cones around the axis of the carrier and the gear-wheel 12 acts through its engagement with pinions 11, 11, etc., to cause the respective cones to rotate at the proper relative rate of speed in the same direction upon their individual axes. The carrier 5 and bevel gear-wheel 12 are driven at the proper speed relative to each other by means of suitable gearing from an actuating shaft, marked 13. The said gearing comprises a spur-pinion 14 fixed on the said shaft 13, a spur-gear 15 fixed upon or formed integral with the hub 12$^a$ of the said bevel gear-wheel, a spur-gear 16, with which gear-wheel 15 is in mesh, fixed upon a short side-shaft 17 supported in bearings in standards 18, one of which is shown in Fig. 1, and a second spur-gear 19 fixed on the said short shaft 17 and meshing with spur-teeth formed on the periphery of the carrier 5.

One aim in connection with the rotary spinner is to cause the cones thereof to revolve around the inclosed portion of the batch of candy without rotating or twisting the candy. This aim is attained preferably by so disposing the said cones that the inclosed space shall be of proper proportions to just receive another cone of the same size, etc., and by so proportioning the gearing that a revolution of a cone with the carrier and a rotation of the cone upon its individual axis shall be performed in equal time. By thus proportioning the inclosed space so that the formed mass of candy occupying the same shall just correspond in shape and size with one of the cones of the spinner, and proportioning the gearing so that each outside cone shall rotate just once on its own axis in revolving once around the candy, the respective cones will simply roll around the candy without tendency to rotate or twist the candy itself. The same result may be attained in cases in which the inclosed space differs in size from the cones of the spinner, by proportioning the gearing so that the surface speed of a cone in rotating upon its individual axis shall just equal the speed at which the cone is caused to travel around upon the exterior of a conical mass of candy occupying the said space.

For working "hard" candy, as in the manufacture of stick candy, cones are employed having smooth surfaces, to thereby avoid any tendency to roughen the surface of the candy, and to avoid feeding the candy along too fast. For working upon soft candy, as in the manufacture of molasses kisses and the like, the cones will have longitudinally-grooved surfaces or the said surfaces will be otherwise adapted to take hold of the candy.

In the special construction of cone shown in Fig. 3, the body of the cone is bored longitudinally to receive the stem of the pintle 10. To engage the said body with the said pintle so as to prevent it from turning relative thereto, and compel it to rotate in unison therewith, the portion of the pintle which projects beyond the forward end of the sleeve-bearing 9 is made tapering, and the bore in the body of the cone is made correspondingly tapering to fit the said portion of the pintle. The cone is forced tightly upon the pintle, into firm frictional engagement therewith. The extremity of the pintle is screw-threaded and receives a washer 22 and nut 22$^a$ which holds the body of the cone in place upon the pintle. A recess 22$^b$ in the end of the cone-body receives the washer and partly receives the nut.

The tips 4$^a$, 4$^a$, etc., of the cones are made as separate pieces and are combined with the body-portions of the cones in manner rendering them readily removable and replaceable. This is conveniently provided for, as shown in Fig. 3, by forming in the butt ends of the said cone-tips internally-threaded holes which fit portions of the screw-threaded extremities of pintles 10, 10, etc., that project beyond the ends of the body-portions of the cones. The butt end of each tip is formed with a recess partly receiving the nut 22ª on the corresponding pintle. One set of tips may be unscrewed from the cones and another set screwed on in the place thereof. By providing sets of tips of different length and size, the diameter of the exit-opening at the small ends of the cones may be varied, with corresponding variation in the diameter of the batch as it issues from the spinner.

I claim as my invention:—

1. In a candy-making machine, in combination, a nest of cones around a cone-shaped space through which the batch is fed, a carrier for said cones supporting the latter by one end only, the other end being unsupported and free, a central bearing-support for said carrier constituting a non-rotating guide through which the batch enters the said space, pinions in connection with the respective cones, a wheel turning on said central support and in driving engagement with said pinions, and means for rotating the carrier and the said wheel respectively.

2. In a candy-making machine, a rotary batch-spinner comprising a nest of reducing and feeding cones, and a carrier for said cones located wholly at the large ends thereof, leaving the other ends thereof free and unsupported, said carrier having for each cone an elongated sleeve-bearing extending within the cone for a portion of the length of the latter.

3. In a candy-making machine, a rotary batch-spinner comprising a nest of cones, a carrier for said cones located wholly at the large ends thereof, leaving the other ends thereof free and unsupported, and an elongated sleeve-and-pintle bearing-support for each cone, having one element thereof combined with the carrier and the other element thereof combined with the cone, the said bearing-support extending within the cone a portion of the length of the latter.

In testimony whereof I affix my signature in presence of two witnesses.

CHARLES H. WORSEY.

Witnesses:
H. WINDT,
R. WEISS.

Copies of this patent may be obtained for five cents each, by addressing the "Commissioner of Patents, Washington, D. C."